No. 12,588. REISSUED JAN. 8, 1907.

K. KIEFER.

FILTERING ELEMENT.

APPLICATION FILED NOV. 23, 1906.

Witnesses:
Henry D. Williams
Bernard Cowen

Inventor:
Karl Kiefer

UNITED STATES PATENT OFFICE.

KARL KIEFER, OF CINCINNATI, OHIO.

FILTERING ELEMENT.

No. 12,588. Specification of Reissued Letters Patent. Reissued Jan. 8, 1907.

Original No. 834,304, dated October 30, 1906. Application for reissue filed November 23, 1906. Serial No. 344,793.

*To all whom it may concern:*

Be it known that I, KARL KIEFER, a citizen of the United States, and a resident of Cincinnati, in the county of Hamilton and State of Ohio, have invented a new and useful Improvement in Filtering Elements, of which the following is a specification.

My invention relates to filter elements of freshly-compressed pulp for the filtration of beer, wines, &c. Wherever the words "compressed pulp" are used in this specification, they are to be understood to mean compressed moist pulp in this art and not manufactures of paper.

The purpose of this invention is to still more perfect and simplify the construction as patented by me January 10, 1905, No. 779,607.

Figure 1:
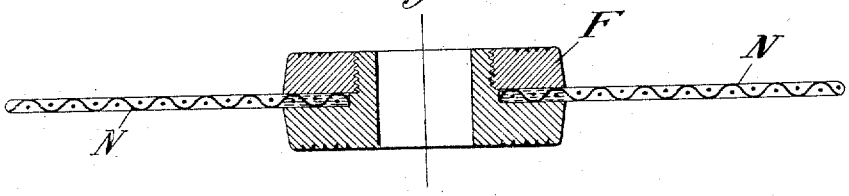
Figure 2:
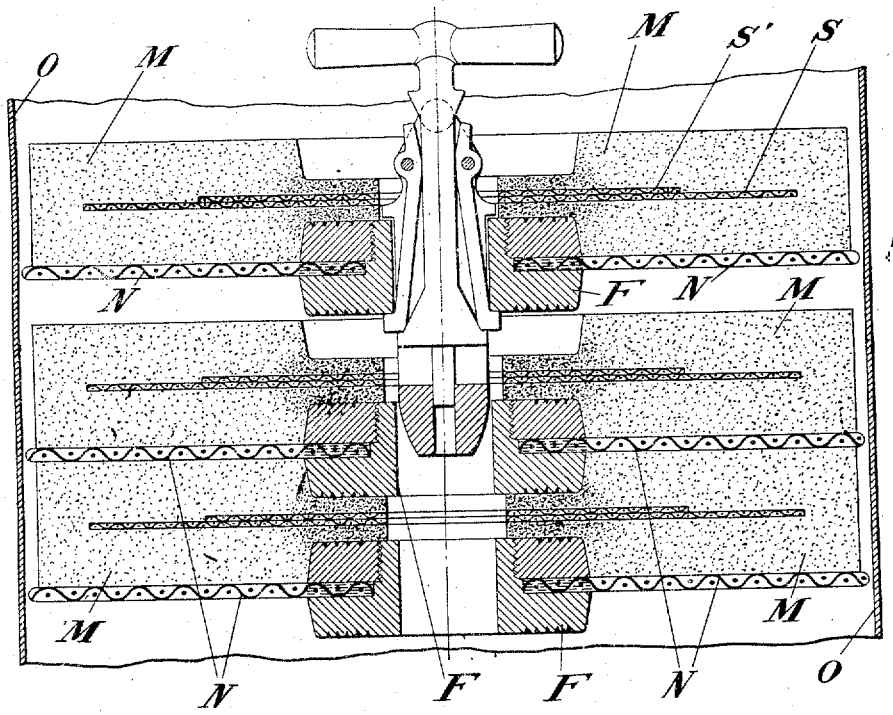

In the drawings, Figure 1 shows an outlet liquid-conductor in cross-section. Fig. 2 shows several superimposed filter elements in cross-section, of which the top one is in the act of being lowered upon the ones underneath.

My new filter elements are very simple and consist of filter mass M, compressed in a special filter-pulp-packing machine, such as the one patented to me January 10, No. 779,548. Embedded in this filter mass is a liquid-conductor for the clear liquid consisting only of fiber-retaining screen. For the definition of "fiber-retaining screen" I refer to my Patent No. 779,607. As shown in the drawings, there are two fiber-retaining screens of different size, the large one S and the smaller one S′. In smaller machines one screen will do, but in larger ones it is preferable to add a second screen S′ of less diameter. I have found that this fiber-retaining screen presents an outlet area sufficiently large for the clear liquid, although the filter mass M may be compressed in a semifluid state from both sides against this screen. It is preferable to use twilled screen, as a very strong pliable screen can be produced thereby. Such screen is commonly used in the art for pulp-filters and is itself not new.

The center part of the filter mass is, as indicated by the increased number of dots, compressed to such an extent that the filter-pulp ceases to be porous. There is just as much filter mass contained within the center part of the filter mass M as is at any other part, but it is considerably more compressed, from three to four times. This compression can be done in one operation, as shown in my Patent No. 813,384, dated February 20, 1906, for "Filtering elements and method of making same;" but it can be done successfully by producing a homogeneous filtering layer first and compressing it afterward. I will state that while pulp-filter layers have been compressed to some extent formerly in the art in a lateral way this compression heretofore has not been efficient enough to prevent the cloudy liquid from entering the clear-liquid conduits, for the reason that the compression was based on the wrong principle. Paper pulp when compressed to a certain density loses its plasticity in certain directions. It cannot be compressed like plastic clay so it expands to all sides, but it can only be compressed in one direction. I may use the expression which designates it best—that while it may be flattened upon a surface it cannot be spread thereon. All devices therefore which rely on spreading alone or in combination with flattening are failures.

N, the inlet liquid-conductor, consists of a single coarse wire screen, as described in Patent No. 779,607, patented to me January 10, 1905. This has a strong flange F on its center to take up the space caused by the compression of the center part of the filter mass and combines the center of all filter elements to a solid tube, interrupted only by the outlet between the fiber-retaining screen. As is easily visible from the drawings, the cloudy liquid cannot pass to the clear-liquid conduit in the center unless it passes between the center flanges F and the strongly-compressed filter mass or through the filter layer. These parts virtually act like a gasket and so successfully separate the cloudy liquid from the clear-liquid conduit. The clear liquid issues between the capillary spaces formed by the fiber-retaining screens S into the center hole. The flange F is fastened in the center to the coarse-wire-screen conductor. The flange F is preferably made of two parts and screwed upon the coarse-wire screen, and the interstices of the screen are filled out with tin where they are inclosed by the flange, which gives the coarse screen additional strength and rigidity and also prevents impurities from settling within the flanges.

All filter elements are commonly used in connection with so-called "drums," which are hollow, and water-tight casings. The former are slightly smaller than the casing, so as to produce a small annular space between them and the drum, and the inlet liquid-conductors are adapted to center the filter elements in reference to each other and to the drum by having a loose fit within the latter. In the drawings such drum is indicated in cross-section by O.

The filter elements must be supported rigidly to some part of the filter, so that the action of the liquid to be filtered upon the filter mass will not cause the collapse of the whole series of filter elements. In filter elements with a central liquid-outlet this can be successfully done by supporting each layer by the hub—as, for instance, shown in my Reissue Patent No. 12,347, May 16, 1905, where a series of filter elements within a drum or casing is supported by metal hubs forming a rigid communication column within the filter. In this construction, however, it is required that all the hubs must be of a certain height in order to fill up all the space within the drum. It is, however, sometimes difficult to make all the filter layers equal in thickness, and the strict requirement that each filter layer should be of a certain height causes a different compression relatively according to the amount of mass that has been used. In the present construction this is overcome by using the central compressed parts of the filter layers for the support of the filter elements. I have found that when moist filter-pulp is compressed considerable of the elasticity of the fiber which it exhibits in its dry state is regained according to the amount of water expressed. The elasticity of the pulp therefore is inversely proportionate to its porosity, and when using a number of filter layers within a drum or casing, such as is used in the art, the elasticity of the central compressed parts in the present construction will allow of sufficient variation within the casing and at the same time produce a sufficiently rigid support for all the filter layers in reference to the base.

If, for instance, twenty elements are packed on top of each other and it is seen that the filter-drum is not quite full, an additional filter element may be placed on top of the pile and by a little stronger compression squeezed into the filter-drum, although without this additional compression it would have appeared that there was not enough space for this additional element. This advantage is derived from the fact that moist paper-pulp at a certain stage of compression becomes elastic, the natural elasticity of the fiber asserting itself when a certain amount of water has been expressed.

Another advantage is that even if the packing-machine should not pack the filter elements to an equal tightness the pressure will equalize itself afterward within the filter.

The fourth advantage is that this pressure upon all the filter elements can be regulated by packing more or less filter elements on top of each other into an equal space.

A lifting instrument, for which I have applied especially in my application, Serial No. 252,268, filed March 27, 1905, can be utilized for placing said filter elements. The center hole in the filter mass M should preferably be made a little larger than the hole in the center hub F of the inlet liquid-conductor, as shown in the drawings. This will facilitate the lifting out of the elements by means of the lifting instrument.

What I claim as my invention, and desire to secure by Letters Patent, is—

1. In a filter, the combination with a drum or casing, of circular filtering layers of compressed fibrous pulp of a diameter somewhat smaller than the casing, and of liquid-conductors draining or supplying such filtering layers, said filtering layers and liquid-conductors completely filling the space between the base and cover of the casing and held in position by an elastic column composed of superposed parts consisting of non-compressible parts of the liquid-conductor, in alternation with compressed parts of the filtering layer, the latter parts compressed to substantial imporosity.

2. In a filter, the combination with a drum or casing, of circular filtering layers of compressed fibrous pulp of a diameter somewhat smaller than the casing, and of liquid-conductors draining or supplying such filtering layers, said filtering layers and liquid-conductors completely filling the space between the base and cover of the casing and held in position by a substantially central elastic column composed of superposed parts consisting of non-compressible parts of the liquid-conductors in alternation with highly-compressed parts of the filtering layers.

In testimony whereof I have signed my name to this specification in the presence of two subscribing witnesses.

KARL KIEFER.

Witnesses:

HENRY D. WILLIAMS,
BERNARD COWEN.